(12) United States Patent
Chen

(10) Patent No.: US 7,802,922 B2
(45) Date of Patent: Sep. 28, 2010

(54) RETAINING STRUCTURE FOR ROLLING ELEMENTS

(75) Inventor: Chiu-Tsun Chen, Taipei County (TW)

(73) Assignee: Ome Technology Co., Ltd., Taipei County (TW)

( * ) Notice: Subject to any disclaimer, the term of this patent is extended or adjusted under 35 U.S.C. 154(b) by 537 days.

(21) Appl. No.: 11/829,395

(22) Filed: Jul. 27, 2007

(65) Prior Publication Data
US 2008/0253707 A1    Oct. 16, 2008

(30) Foreign Application Priority Data
Apr. 13, 2007   (TW) .............................. 96205958 U

(51) Int. Cl.
*F16C 29/06*   (2006.01)
(52) U.S. Cl. .......................................... 384/51; 384/45
(58) Field of Classification Search ............. 384/43–45, 384/51, 523, 525–534
See application file for complete search history.

(56) References Cited

U.S. PATENT DOCUMENTS

| | | | | |
|---|---|---|---|---|
| 5,082,375 A | * | 1/1992 | Hillmann | .................... 384/526 |
| 6,102,572 A | * | 8/2000 | Hidano | ......................... 384/45 |
| 6,830,378 B2 | * | 12/2004 | Michioka et al. | .............. 384/49 |
| 2002/0025088 A1 | * | 2/2002 | Kuo | ............................. 384/51 |
| 2002/0044703 A1 | * | 4/2002 | Itabashi | ....................... 384/45 |
| 2007/0110345 A1 | * | 5/2007 | Hsu et al. | ..................... 384/45 |

* cited by examiner

*Primary Examiner*—Thomas R Hannon
(74) *Attorney, Agent, or Firm*—Rosenberg, Klein & Lee

(57) ABSTRACT

An improved retaining structure for a rolling element comprises a plurality of separated pieces, two pairs of connecting ribbons, two pull-resisting ribbons, and a plurality of rolling elements. The separated pieces respectively have a plurality of contacting surfaces on the front and rear surfaces thereof. A partially wrapped containing space for receiving the rolling elements is defined between each two contacting surfaces. The two pairs of connecting ribbons are installed in pairs on two sides of the separated pieces. The two pull-resisting ribbons are installed on the two sides of the separated pieces respectively and connect with the two pairs of connecting ribbons. Thereby, the rolling elements are kept in a central position between the separated pieces in a partial wrapping manner to prevent the rolling elements from being improper clipped or from escaping when performing circumrotation motions. Furthermore, the uniform flexibility of the pull-resisting ribbons is increased.

11 Claims, 8 Drawing Sheets

RETAINING STRUCTURE FOR ROLLING ELEMENTS

BACKGROUND OF THE INVENTION

1. Field of the Invention

The present invention relates to an improved retaining structure for a rolling element and more particularly to a structure that ensures the rolling element rolls stably and smoothly so as to provide a high precision operation of linear guide.

2. Description of the Prior Art

A retaining for rolling elements is usually used to contain rolling elements so that the rolling elements can achieve an excepted rolling and further perform repeated circumrotation motions. It is often applied to high-speed operations or accuracy adjustments, such as for a linear guide.

Please refer to FIG. 1 and FIG. 2, which are respectively a perspective schematic view and a top view of a retaining for a rolling element of the prior art. The retaining comprises a plurality of separated pieces 1a, two pull-resisting ribbons 3a, and a plurality of rolling elements 4a. Two sides of the separated pieces 1a both connect with a connecting ribbon 2a and the two connecting ribbons 2a are connected with the two pull-resisting ribbons 3a on two sides of the separated pieces 1a. Thereby, the separated pieces 1a are equidistantly arranged between the two pull-resisting ribbons 3a.

A front surface and a rear surface of the separated pieces 1a both have an integrally formed spherical surface 11a. The spherical surfaces 11a are relatively formed with the rolling elements 4a wherein the rolling elements 4a are rolling balls. The rolling elements 4a can be contained between the separated pieces 1a. The spherical surfaces 11a are closely adjoined to the rolling elements 4a. Thereby, the rolling elements 4a are stably rolled between the separated pieces 1a.

Please refer to FIG. 3 and FIG. 4, which are separately a perspective schematic view and a top view of a retaining for a rolling element of another prior art. A front surface and a rear surface of the separated pieces 1a both have a groove 12a. The grooves 12a are formed by concaving end surfaces of the separated pieces 1a. Two side edges of the grooves 12a provide a point contact to surfaces of the rolling elements 4a. The rolling elements 4a are disposed between the separated pieces 1a in a manner such that they can roll.

Each of the pull-resisting ribbons 3a has a flexible section 31a and a non-flexible section 32a thereon. The flexible section 31a is disposed at a longitudinal distance between two separated pieces 1a that correspond to the pull-resisting ribbon 3a, and the pull-resisting ribbon 3a has a non-flexible section thereon 32a. The non-flexible section 32a is disposed at a longitudinal distance to the sides of the separated pieces 1a and near to a front edge and a rear edge of the separated pieces 1a that corresponds to the pull-resisting ribbon 3a.

The rolling elements 4a are rolled and kept between the separated pieces 1a to perform repeated circumrotation motions according to combination of the above-mentioned elements. When the rolling elements 4a pass through circumrotation areas, the flexible sections 31a of the two pull-resisting ribbons 3a perform certain elasticity deformation to reduce the friction so that the rolling elements 4a fluently pass the circumrotating areas and continuously perform repeated circumrotation motions.

However, the above-mentioned retaining for rolling elements has the following drawbacks in practice:

1. The rolling elements 4a are respectively wrapped by a single spherical surface 11a of the separated pieces 1a and matched in a surface contacting manner so that the rolling elements 4a produce an inappropriate friction and are inappropriately clipped when performing repeated circumrotation motions. In the second prior art, the rolling elements 4a are matched with the grooves 12a in a point contacting manner so that the rolling elements 4a cannot be stably kept in a central position of the separated pieces 1a causing the rolling elements 4a to escape when performing repeated circumrotation motions.

2. In order to increase the strength of the connection between the connecting ribbons 2a and the pull-resisting ribbons 3a, a collective connection area is added. However, this reduces the uniform flexibility of the flexible sections 31a so as to produce an inappropriate friction and deformation that influences the repeating circumrotation motion. In another prior art, there is a longer flexible section and a smaller collective connection area that produces insufficient strength in the structure so as to fracture the repeating circumrotation connection.

3. The molds of the spherical surfaces 11a of the separated pieces 1a (as shown in FIG. 1) or the grooves 12a (as shown in FIG. 2) are not easily released and easily distort the size of the spherical surfaces 11a and the grooves 12a.

The inventor of the present invention recognizes the above shortages should be corrected and special effort has been paid to research this field. The present invention is presented with reasonable design and good effect to resolve the above problems.

SUMMARY OF THE INVENTION

The primary object of the present invention is to provide an improved retaining structure for a rolling element wherein the rolling element is kept in a central position between separated pieces via a partial wrapping manner so as to prevent the rolling element from being inappropriately clipped and squeezed and from escaping when performing repeated circumrotation motions.

Another object of the present invention is to provide an improved retaining structure for a rolling element to increase the uniform flexibility of the pull-resisting ribbons by adding to the number of connecting ribbons so as to reduce the friction, avoid deformation, and prevent any fracturing of the rolling element.

It is a further object of the present invention to provide an improved retaining structure for a rolling element to reduce the manufacturing costs incurred by the molds of the separated pieces and the two pairs of connecting ribbons that are easily released and formed.

For achieving the objects stated above, the improved retaining structure for the rolling element comprises a plurality of separated pieces which have a plurality of lubricant retaining portions formed by the concave surfaces of the separated pieces. The separated pieces have a plurality of contacting surfaces on the front surface and the rear surface thereof separately, while the a partially wrapped containing space is defined between each two contacting surface; two pairs of connecting ribbons are installed on two sides of the separated pieces; two pull-resisting ribbons are installed on the two sides of the separated pieces respectively and connected with the two pairs of connecting ribbons; and a plurality of rolling elements are contained in the partially wrapped containing space in a manner such that they can roll.

Hence, the present invention has the following advantages:

The contacting surfaces of the separated pieces are partially contacted with the rolling elements to reduce friction and prevent the rolling elements from becoming inappropriately clipped, squeezed and from escaping.

Furthermore, the separated pieces are connected with the two pull-resisting ribbons via the two pairs of connecting ribbons so as to increase the uniform flexibility and strength of the pull-resisting ribbons and substantially reduce friction produced by the repeated circumrotation motions of the two pull-resisting ribbons to effectively overcome fracturing and distortion of the pull-resisting ribbons.

Furthermore, the molds of the separated pieces and the two pairs of connecting ribbons are easily released and formed so as to effectively increase the yield of products and reduce manufacturing costs.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF THE DRAWINGS

The above and further advantages of this invention may be better understood by referring to the following description, taken in conjunction with the accompanying drawings, in which.

Figure 2:
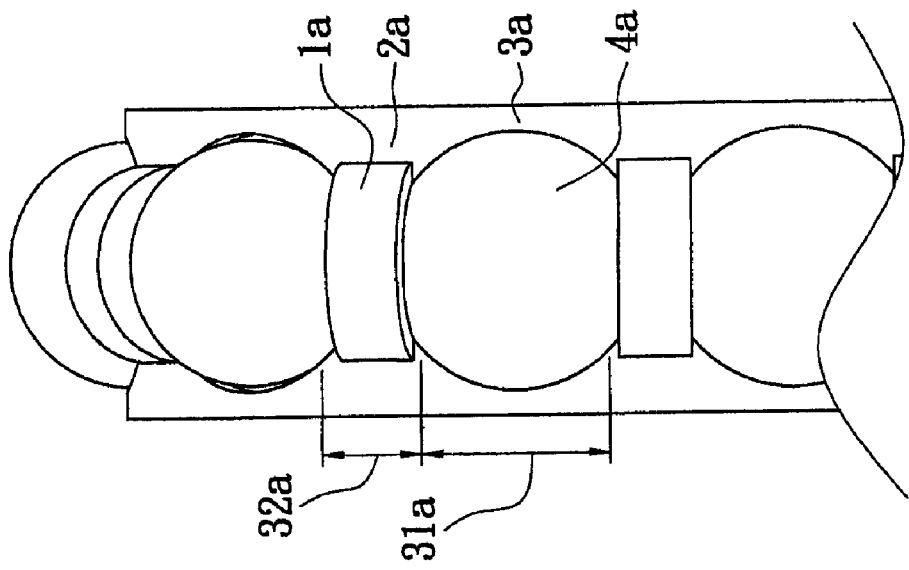
FIG. 2 is a top view of the retaining for the rolling elements of the prior art.
Figure 1:
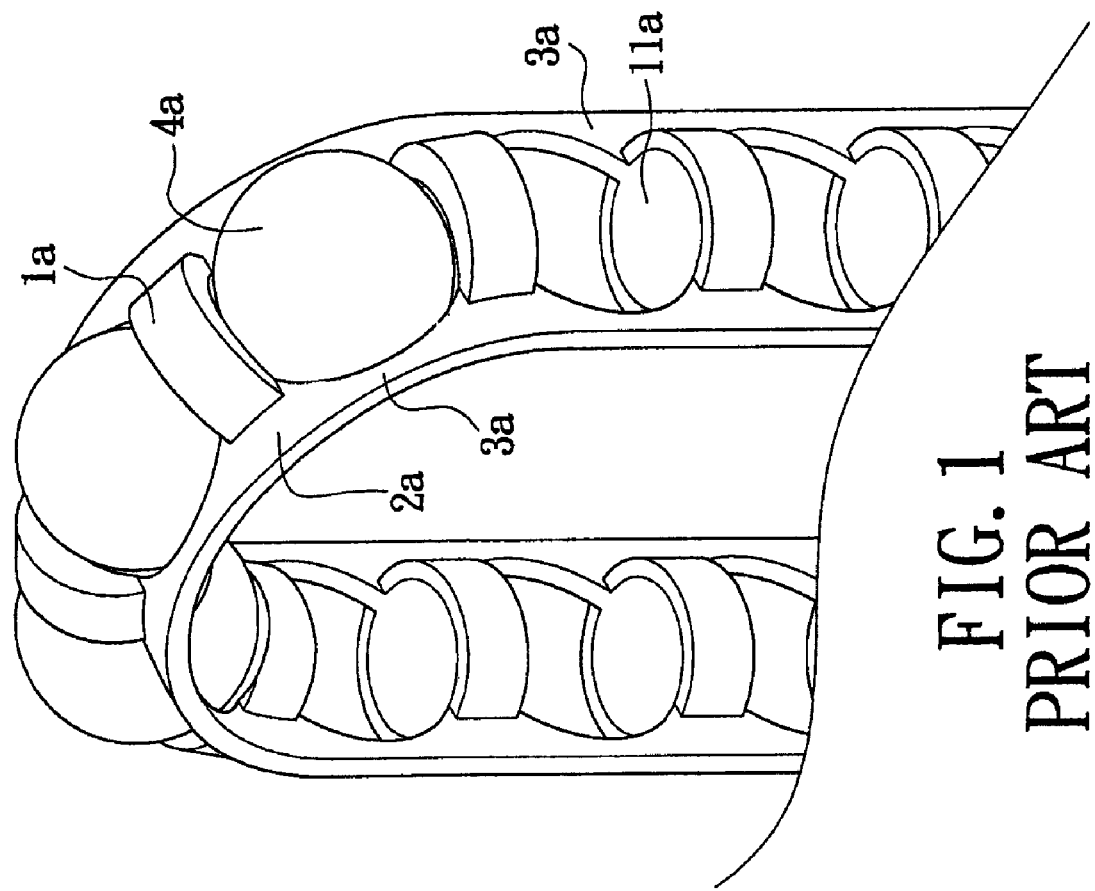
FIG. 1 is a perspective schematic view of a retaining for rolling elements of the prior art.
Figures 3, 4:
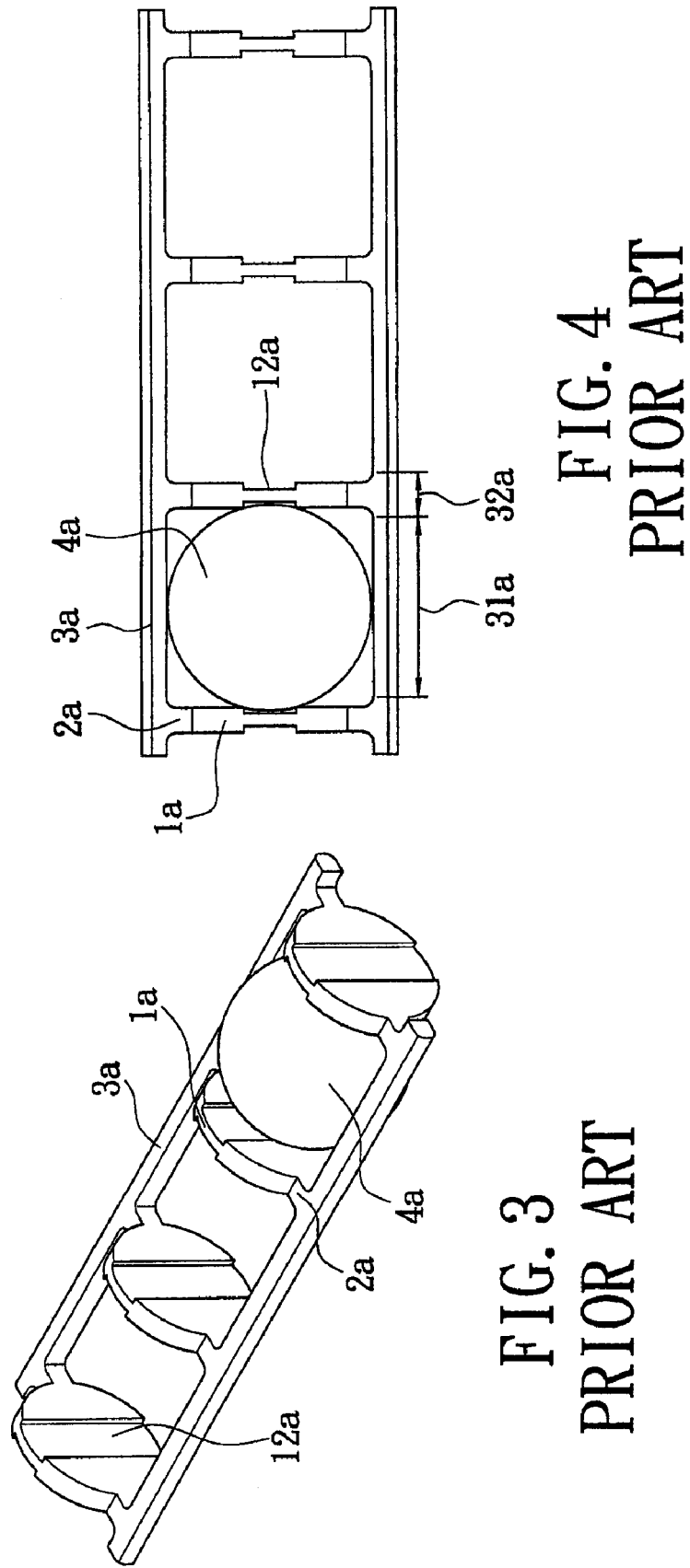
FIG. 3 is a perspective schematic view of a retaining for the rolling elements of the second prior art.
FIG. 4 is a top view of the retaining for the rolling elements of the second prior art.
Figure 5:
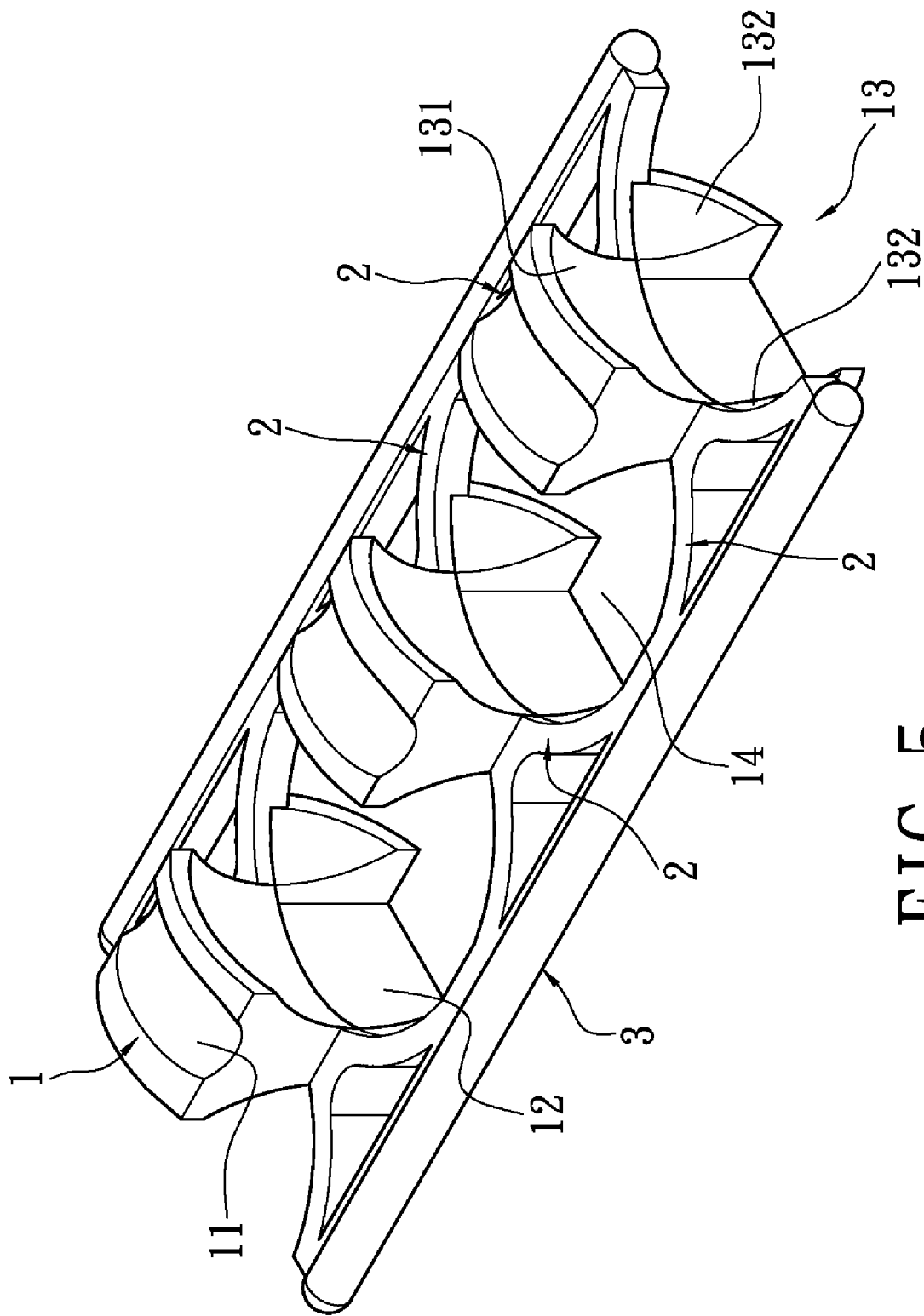
FIG. 5 is a perspective schematic view of an improved retaining structure for rolling elements according to the present invention.
Figure 6:
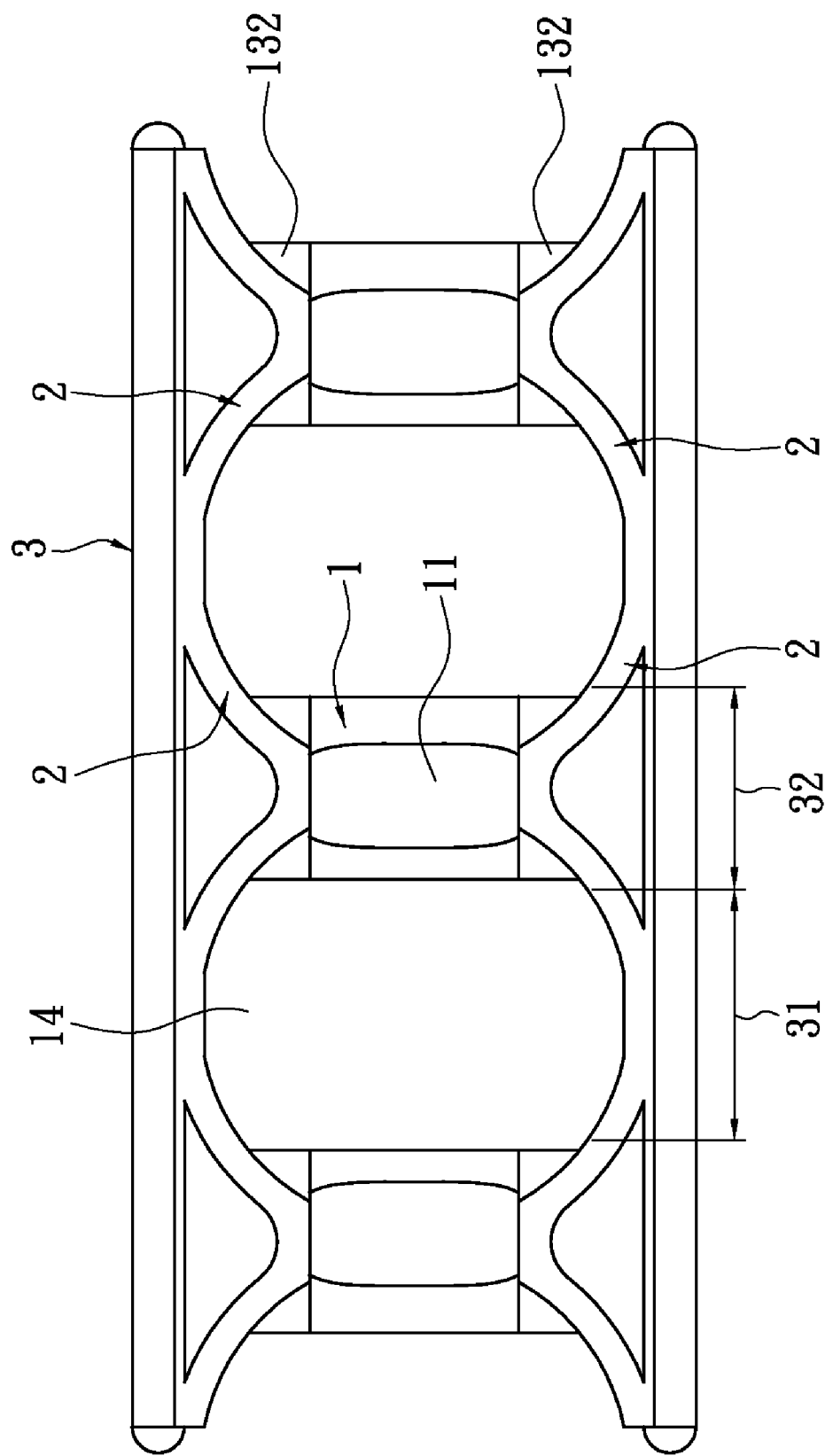
FIG. 6 is a top view of the improved retaining structure for the rolling elements according to the present invention.
Figure 8:
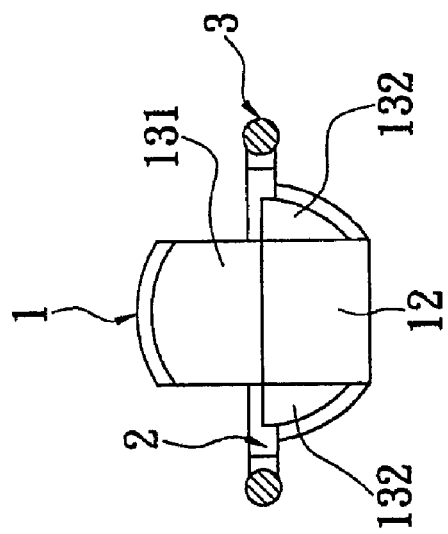
FIG. 8 is a front view of the improved retaining structure for the rolling elements according to the present invention.
Figure 7:
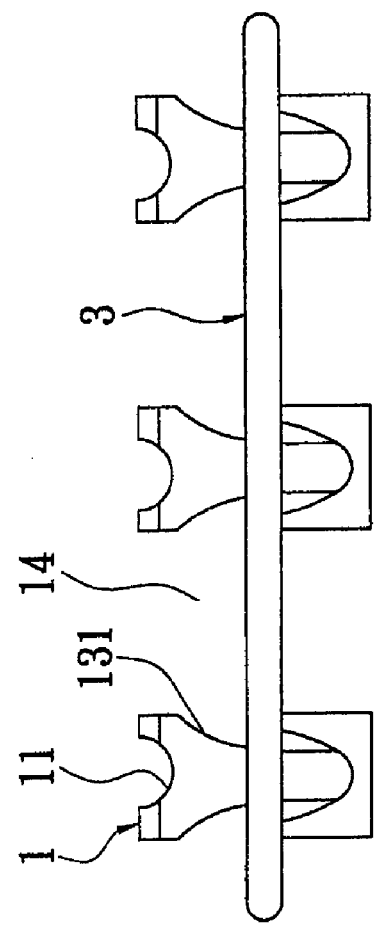
FIG. 7 is a side view of the improved retaining structure for the rolling elements according to the present invention.
Figure 9:
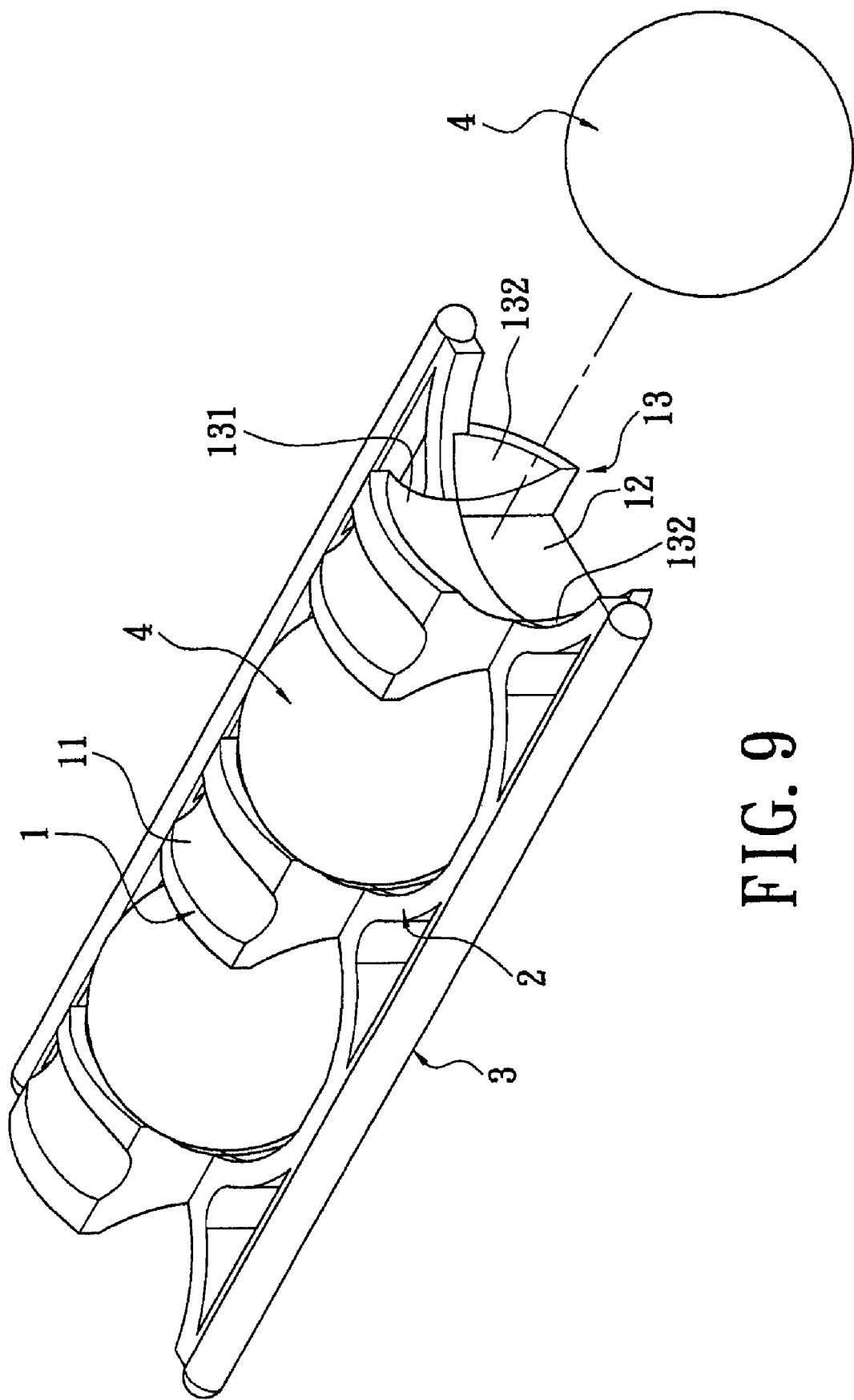
FIG. 9 is a schematic view of the installation of the rolling elements according to the present invention.

The drawings will be described further in connection with the following Detailed Description of the Invention.

DETAILED DESCRIPTION OF THE PREFERRED EMBODIMENTS

Please refer to FIG. 5 to FIG. 9. The present invention provides repeated circumrotation motions in a linear guide 5 and comprises a plurality of separated pieces 1, two pairs of connecting ribbons 2, two pull-resisting ribbons 3, and a plurality of rolling elements 4.

The separated pieces 1 are standing boards and are arranged equidistantly between the two pull-resisting ribbons 3. The separated pieces 1 have a plurality of lubricant retaining portions formed by concave surfaces of the separated pieces 1 and are used to provide lubricating oil. The separated pieces 1 have a front end surface and a rear end surface. Each of the end surfaces of the separated pieces 1 has a plurality of contacting surfaces 13. The lubricant retaining portion comprises a first groove 11 and two second grooves 12. The first groove 11 is an open arc groove and is formed by downwardly concaving an upper end of the separated pieces 1 so that it communicates the two sides of the separated pieces 1. The two second grooves 12 are formed on the front surfaces and the rear surfaces of the separated pieces 1 separately and closely adjoin on the contacting surfaces 13 of the separated pieces 1 so that they are formed with the contacting surfaces 13.

A plurality of contacting surfaces 13 is disposed on the front surfaces and the rear surfaces of separated pieces 1. The contacting surfaces 13 of the separated pieces 1 have a first spherical surface 131 and two second spherical surfaces 132. The two second spherical surfaces 132 are installed relatively on two side edges of the separated pieces 1 and are formed by being outwardly extended. The first spherical surface 131 is formed by being upwardly extended from the two second spherical surfaces 132 and connecting with an upper edge of the separated pieces 1.

The first spherical surface 131 and the two second spherical surfaces 132 are formed correspondingly with the rolling elements 4. A partially wrapped containing space 14 is collectively formed as a single piece between the first spherical surface 131 and the two second spherical surfaces 132. In other words, the containing space 14 is defined between a rear surface of a separated piece 1 and a front surface of another separated piece 1. The containing space 14 is used to contain the rolling elements 4 so that the first spherical surface 131 and the two second spherical surfaces 132 provide a partial surface contact to the surfaces of the rolling elements 4.

The two pairs of connecting ribbons 2 are installed in pairs in the two sides of the separated pieces 1 and are connected with the contacting surfaces 13. One end of the two pairs of connecting ribbons 2 is closely adjoined to the second spherical surfaces 132 of the separated piece 1 and upwardly extended and relatively diverged to the pull-resisting ribbon 3.

The two pull-resisting ribbons 3 are installed on the two sides of the separated pieces 1 and connected with the outer edges of the two pairs of connecting ribbons 2. The pull-resisting ribbon 3 has a circular cross section and has a flexible section 31 and a non-flexible section 32. The flexible section 31 is a longitudinal distance between the two separated pieces 1 and corresponds to the pull-resisting ribbon 3. The other end of the two pairs of connecting ribbons 2 is connected with a central position of the flexible section 31 of the pull-resisting ribbon 3. The pull-resisting ribbon 3 has a non-flexible section 32 thereon, wherein the non-flexible section 32 is disposed at a longitudinal distance to the sides of the separated pieces 1 and near a front edge and a rear edge of the separated pieces 1 and corresponds to the pull-resisting ribbon 3.

Please refer to 9. The rolling elements 4 are rolling balls or rolling pillars with high roundness that can be individually contained in the partially wrapped containing space 14. The rolling elements 14 can be kept in a central position between the separated pieces 1 because the contacting surfaces 13 are partially wrapped.

Figure 10:
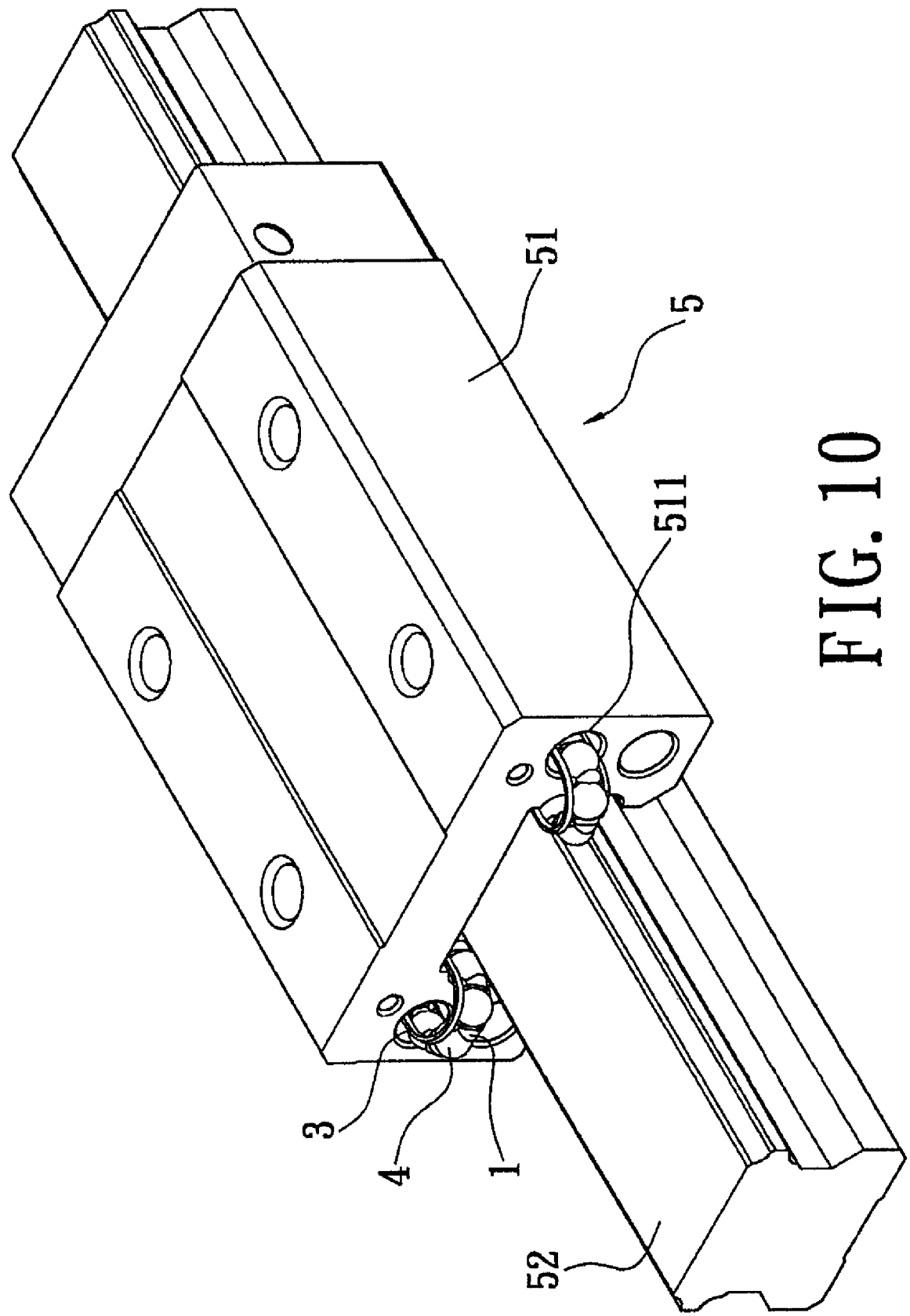
FIG. 10 is a perspective schematic view of the retaining for the rolling elements being installed on a linear sliding track device according to the present invention.
Figure 11:
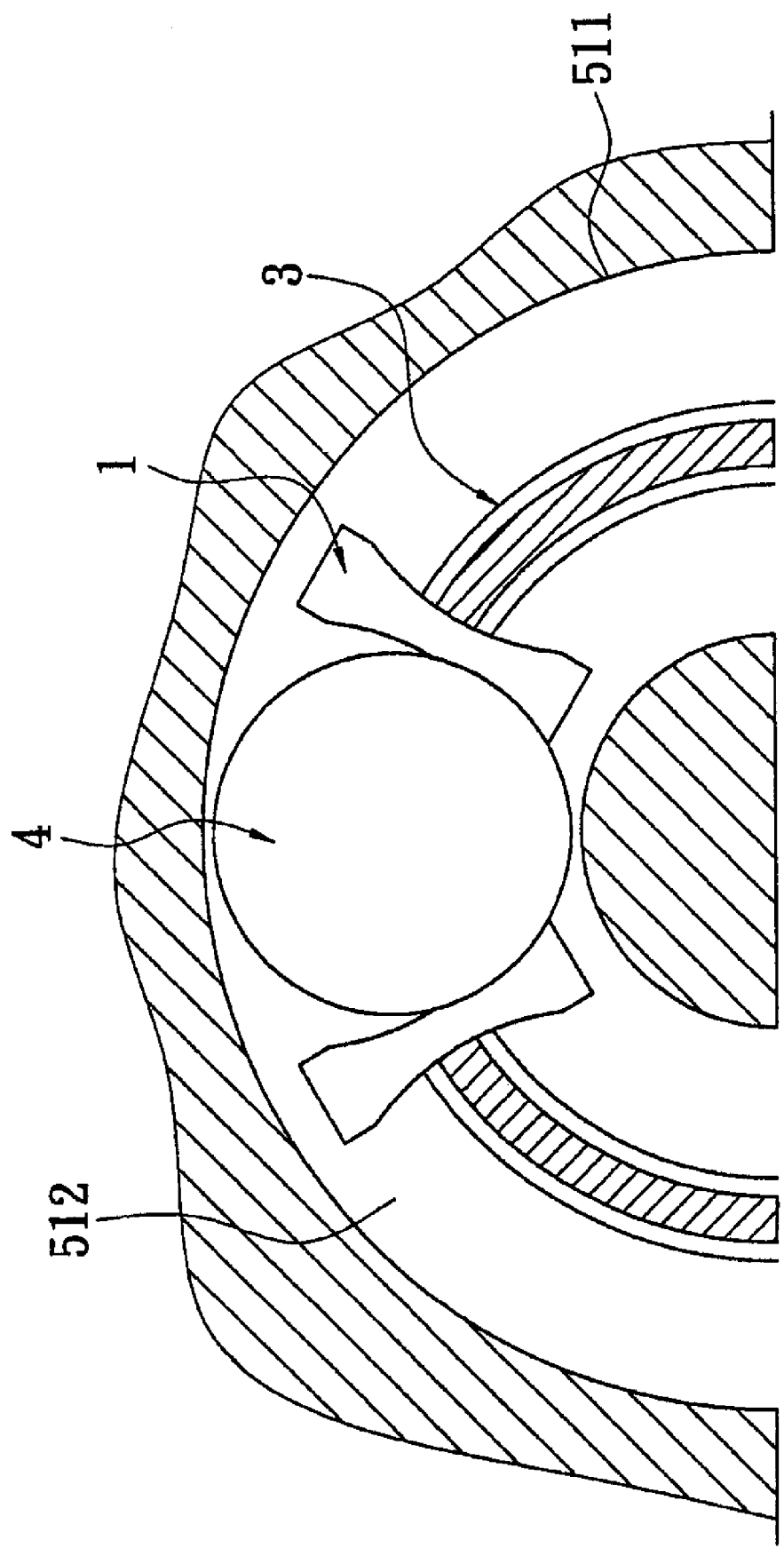
FIG. 11 is a schematic view of the retaining for the rolling elements performing repeated circumrotation motions.

Please refer to FIG. 10 and FIG. 11. The rolling elements 4 are installed on a linear guide 5 according to a combination of the above-mentioned elements. The linear guide 5 has a sliding block 51 and a sliding track 52. The sliding block 51 has a plurality of guiding grooves 511 formed opposite each other. Inner surfaces of the guiding grooves 511 are correspondingly formed with the rolling elements 4. The rolling elements 4 and the separated pieces 1 are installed in series in the guiding grooves 511. The rolling elements 4 and the two pull-resisting ribbons 3 provide a point contact to the inner surfaces of the guiding grooves 511 and perform repeated circumrotation motions. When the rolling elements 4 pass through circumrotating areas 512 (as shown in FIG. 11), the flexible sections 31 perform certain elasticity deformation to adapt to the curvature variations in the circumrotating areas 512. Meanwhile, the rolling elements 4 can be kept in a central position between the separated pieces 1 by the contacting surfaces 13 so that the rolling elements 4 fluently pass the circumrotating areas 512 and continuously perform repeated circumrotation motions to accurately correct a relative position of the sliding block 51 on the sliding track 52.

Thereby, the improved retaining structure for the rolling elements of the present invention has the following characteristics and functions:

1. The rolling elements 4 are respectively contained in the partially wrapped containing space 14 so as to reduce friction and prevent the rolling elements 14 from being inappropriately clipped, squeezed or from escaping due to the contacting surfaces 13 that provide a partial surface contact to the rolling elements 14.

2. The separated pieces 1 are connected with the two pull-resisting ribbons 3 by the two pairs of connecting ribbons 2 so as to increase the uniform flexibility and strength of the pull-resisting ribbons 3 and substantially reduce friction produced by the repeated circumrotation motions of the two pull-resisting ribbons flexile section 3 and effectively overcome fracturing and distortion of the pull-resisting ribbons.

3. The molds of the separated pieces 1 and the two pairs of the connecting ribbons 2 are easily released and formed so as to effectively increase of the product yield and reduce manufacturing costs.

What is claimed is:

1. An improved retaining structure for a rolling element, comprising:
   a plurality of separated pieces, each separated piece having a plurality of lubricant retaining portions formed by inwardly concave surfaces thereof, wherein each separated piece has a curved contacting surface respectively formed on a front surface and a rear surface thereof, a plurality of containing spaces being respectively defined between each of two corresponding curved contacting surfaces of adjacent pairs of the plurality of separated pieces;
   a pair of connecting ribbons extend oppositely from each of two ends of each separated piece;
   two pull-resisting ribbons being respectively disposed adjacent the two ends of each of the plurality of separated pieces, each pull-resisting ribbon being connected to a corresponding pair of the connecting ribbons extending from each of the separated pieces; and
   a plurality of rolling elements respectively retained in the plurality of containing spaces.

2. The improved retaining structure for the rolling element as claimed in claim 1, wherein the lubricant retaining portion comprises a first groove and two second grooves, the first groove having an inwardly concave surface formed in an upper end of a respective separated piece, the two second grooves being respectively formed on the front and the rear surfaces of a respective separated piece, each of the second groves being disposed adjacent a corresponding one of the curved contacting surfaces of the respective separated piece.

3. The improved retaining structure for the rolling element as claimed in claim 2, wherein each curved contacting surface includes a first spherical surface portion and two second spherical surface portions, the two second spherical surface portions being disposed below respective connecting ribbons on opposing ends of a respective side of a corresponding separated piece, the first spherical surface portion being disposed above a respective one of the second grooves of the corresponding separated piece.

4. The improved retaining structure for the rolling element as claimed in claim 2, wherein the first groove is an open arc shaped groove in communication with the two ends of the respective separated piece.

5. The improved retaining structure for the rolling element as claimed in claim 1, wherein the contacting surfaces are correspondingly to the rolling elements and the contacting surfaces partially touch the surfaces of the rolling elements.

6. The improved retaining structure for the rolling element as claimed in claim 1, wherein each pull-resisting ribbon has a circular cross section.

7. The improved retaining structure for the rolling element as claimed in claim 1, wherein each pull-resisting ribbon has a flexible section extending for a longitudinal distance between respective pairs of the separated pieces.

8. The improved retaining structure for the rolling element as claimed in claim 7, wherein each connecting ribbon connects with a respective one of the pull-resisting ribbons at a middle portion of the flexible section.

9. The improved retaining structure for the rolling element as claimed in claim 7, wherein each pull-resisting ribbon has a non-flexible section disposed between adjacent flexible sections.

10. The improved retaining structure for the rolling element as claimed in claim 1, wherein the separated pieces are equidistantly arranged between the two pull-resisting ribbons.

11. The improved retaining structure for the rolling element as claimed in claim 1, wherein the rolling elements are rolling balls.

* * * * *